(12) United States Patent
Yuan et al.

(10) Patent No.: US 8,017,671 B2
(45) Date of Patent: Sep. 13, 2011

(54) THERMOSETTING RESIN FOR EXPEDITING A THERMOSETTING PROCESS

(75) Inventors: Yanhua Yuan, Jiangsu (CN); Meixin Ding, Jiangsu (CN)

(73) Assignees: ITEQ (WUXI) Electronic Technologies Co., Ltd., Jiangsu (CN); ITEQ Corporation, Taoyuan (TW)

( * ) Notice: Subject to any disclaimer, the term of this patent is extended or adjusted under 35 U.S.C. 154(b) by 0 days.

(21) Appl. No.: 12/484,160

(22) Filed: Jun. 12, 2009

(65) Prior Publication Data
US 2010/0317785 A1 Dec. 16, 2010

(51) Int. Cl.
| | |
|---|---|
| *C08L 63/00* | (2006.01) |
| *B32B 27/38* | (2006.01) |
| *C08G 59/40* | (2006.01) |
| *C08G 59/68* | (2006.01) |

(52) U.S. Cl. ........ 523/427; 523/435; 523/445; 523/451; 523/455; 525/525

(58) Field of Classification Search ........................ None
See application file for complete search history.

(56) References Cited

U.S. PATENT DOCUMENTS

| | | | | |
|---|---|---|---|---|
| 5,308,895 A | * | 5/1994 | Gan et al. | 523/445 |
| 5,407,977 A | * | 4/1995 | Everett et al. | 523/429 |
| 6,703,124 B2 | * | 3/2004 | Kim et al. | 428/375 |

* cited by examiner

*Primary Examiner* — Michael J Feely

(57) ABSTRACT

The present invention discloses a thermosetting resin for expediting a thermosetting process. The thermosetting resin is composed of 100 parts of primary resin formed by mixing a brominized epoxy resin, a tetrafunctional epoxy resin and an epoxy resin with a high bromine content, and other materials including 35 parts of phenolic resin curing agent, 30 parts of tetrabromobisphenol A curing agent, 0.1 part of 2-ethyl-4-methylimidazole, 0.8 part Lewis acid, and 50~70 parts of solvent, calculated based on every 100 parts of the primary resin by weight. The invention can expedite a thermosetting process and enhance the Tg of prepregs and clad laminates.

3 Claims, No Drawings

THERMOSETTING RESIN FOR EXPEDITING A THERMOSETTING PROCESS

BACKGROUND OF THE INVENTION

1. Field of the Invention

The present invention relates to a thermosetting resin, in particular to a thermosetting resin capable of expediting thermosetting process and enhancing the Tg of prepregs and clad laminates.

2. Description of the Prior Art

In a technology related to the manufacture of semi-finished goods of printed circuit boards, fiberglass cloth containing a prepreg (PP) formed by drying a soaked resin, and then the prepreg is combined with copper to form a so-called copper clad laminate or a non-copper clad laminate by a thermal pressing method. According to the electric properties and the requirements of the products, an increasingly higher heat resistance is required, and thus the glass transition temperature Tg of the required materials is increased gradually as well.

A prior art as disclosed in R.O.C. Pat. No. I259187 delays and controls the reaction of a catalyst by boric acid to improve the solidification density of epoxy resin to enhance the effect of Tg, and whose principle is to use coordination bonds of oxalic acid and imidazole to suppress the catalysis of imidazole at a low temperature, and fully catalyze imidazole at a high temperature when oxalic acid and imidazole are separated. This method does not require the general resin curing agent, but the way of delaying the solidification time to improve the solidification density is not helpful to the mass production of the product, particularly in the present efficient world, and this method increases the time and cost. Although the Tg can be improved by using imidazole to catalyze a polyester structure formed by a ring-opening reaction of epoxy resin, yet the moisture absorption or heat resistance of the structure still need feasible solutions.

SUMMARY OF THE INVENTION

Therefore, it is a primary objective of the present invention to provide a thermosetting resin capable of expediting and shortening a thermosetting process.

To achieve the foregoing objectives, the invention provides a thermosetting resin for expediting a thermosetting process and the thermosetting resin is comprised of: 100 parts of primary resin formed by mixing a brominized epoxy resin, a tetrafunctional epoxy resin and an epoxy resin with a high bromine content, and other materials including 35 parts of phenolic resin curing agent, 30 parts of tetrabromobisphenol A (TBBA) curing agent, 0.1 part of 2-ethyl-4-methylimidazole (2E4MZ), 0.8 part Lewis acid, and 50~70 parts of solvent, calculated based on every 100 parts of the primary resin by weight. The invention can expedite a thermosetting process and enhance the Tg of prepregs and clad laminates.

The Lewis acid is oxalic acid, boric acid, phosphoric acid or salicyclic acid.

The solvent is propylene glycol monomethyl ether (PM), cyclohexanone or propylene glycol monomethyl ether acetate (PMA).

After the aforementioned solution is adopted, the present invention keeps the necessary compositions of the curing agent or solidification resin to prevent a change of properties to the board after the curing process is accelerated. The invention integrates the relation between the Lewis acid and the accelerator imidazole of the prior art with to change the role of Lewis acid as a solidification suppressor, to be used as an accelerator for hot pressing the prepreg into a laminate.

The method of the present invention uses the Lewis acid with a high proportion to extend the effect of suppressing imidazole and fully extend the catalysis and solidification effect of the imidazole, such that the semi-solidified prepregs can be fully hot pressed at a high temperature for the imidazole reaction to achieve the effects of expediting the solidification effect and reducing the hot pressing process.

The prior art uses Lewis acid to suppress the catalysis time of the accelerator, but the present invention uses an opposite way by using the effect of the coordination temperature of Lewis acid and the suppressor to control the effect of accelerating the solidification at a later stage of the thermal pressing process, and reduce the time required for the hot pressing process.

Unlike the prior art using a relatively smaller quantity of Lewis acid with respect to the imidazole, the present invention uses a relatively larger quantity of Lewis acid, such that some of the imidazole can be solidified and catalyzed during the hot pressing process to reduce the time of the hot pressing process.

DETAILED DESCRIPTION OF THE PREFERRED EMBODIMENTS

The present invention discloses a thermosetting resin for expediting a thermosetting process, and the thermosetting resin is comprised of: 100 parts of primary resin 100, and other materials including 65 parts of a curing agent, 0.1 part of an accelerator, 0.8 part of Lewis acid and 50~70 parts of solvent, calculated based of 100 parts of the primary resin by weight.

The primary resin is formed by mixing: a first brominated epoxy resin, also referred to as a brominized epoxy resin; an epoxy resin having four epoxy groups per molecule, also referred to as a tetrafunctional epoxy resin; and a second brominated epoxy resin distinct from said first brominated epoxy resin, also referred to as an epoxy resin with high bromine content. The brominized epoxy resin is a high Tg, flame retardant and heat resisting material, and the tetrafunctional epoxy resin is also a high Tg material, and the epoxy resin with high bromine content is used as a flame retardant material.

The curing agent is composed of 35 parts of phenolic resin (PN curing agent) and 30 parts of tetrabromobisphenol A curing agent. The tetrabromobisphenol A curing agent is also a flame retardant material.

The accelerator is used for accelerating and controlling the glue hardening time, and the accelerator is 2-ethyl-4-methylimidazole used in the invention.

Lewis acid is used for controlling the catalysis of the accelerator, and oxalic acid, boric acid, phosphoric acid or salicylic acid is used in the invention.

Propylene glycol monomethyl ether (PM), cyclohexanone or propylene glycol monomethyl ether acetate (PMA) is used as a solvent in the invention.

In the manufacturing process, resins are prepared according to the proportion by weight, and a glass fiber cloth is soaked with resins and dried to form semi-solidified prepregs, and the temperature is controlled within 150~200 degrees, and the semi-solidified prepreg are melted by high temperature and high pressure, and a ring-opening reaction and a solidification of epoxy resin are performed to produce an adhesive force for pressing a plurality of semi-solidified prepregs, wherein the pressure is 350 Psi (lb/in$^2$), the solidification temperature is 200 degree, the manufacturing time is 90 minutes, and the level of vacuum is 10~20 torrs.

The thermosetting resin of the invention is compared with two control groups as shown in the following table:

| Composition | Name | Emobiment 1 | Control 1 | Control 2 | Control 3 | Control 4 |
|---|---|---|---|---|---|---|
| Primary Resin | Brominized epoxy resin (80%) Tetrafunctional epoxy resin (10%) Epoxy resin with a high bromine content (10%) | 100 parts (Primary Resin) | 100 parts | 100 parts | 100 parts | 100 parts |
| Curing Agent | Phenolic resin curing agent | 35 (phr) | 35 (phr) | 35 (phr) | 35 (phr) | 35 (phr) |
|  | Tetrabromobisphenol A curing agent (TBBA) | 30 (phr) | 30 (phr) | 30 (phr) | 30 (phr) | 30 (phr) |
| Accelerator | 2-ethyl-4-methylimidazole (2E4MZ) | 0.1 (phr) | 0.1 (phr) | 0.1 (phr) | 0.1 (phr) | 0.1 (phr) |
| Lewis Acid | Oxalic acid (boric acid, phosphoric acid or salicyclic acid) | 0.8 (phr) | 0.55 (phr) | 0.4 (phr) | 0.25 (phr) | 0 |
| Solvent | PM, Cyclohexanone or PMA | 60 (phr) | 60 (phr) | 60 (phr) | 60 (phr) | 60 (phr) |
| Gel Time (second) |  | 253 | 263 | 270 | 276 | 285 |
| Tg of Laminate after 200-deg Hot Pressing has taken place for 50 minutes |  | 183 | 181 | 179 | 178 | 176 |
| Tg of Laminate after 200-deg Hot Pressing has taken place for 70 minutes |  | 185 | 184 | 182 | 180 | 180 |

The present invention uses a relatively large quantity of Lewis acid to suppress the accelerator for the catalysis of the curing agent when the prepreg is dried and formed at a low temperature. After the manufactured semi-finished goods of prepregs form a laminate in a high-temperature hot pressing process, the Lewis acid will not have action on the accelerator, such that accelerator the catalyzed into a semi-finished prepreg and complete the solidification at a high temperature and a high pressure, so as to achieve the effect of expediting the reaction.

With reference to Control 4 in the table above, the gel time for manufacturing the prepregs without adding Lewis acid takes a longer time of 285 seconds, and the glass transition temperature Tg is lower (176). With reference to Control 3, 0.25 time of oxalic acid is used to achieve a significant effect of suppressing the solidification of the prepregs, and the gel time for the manufactured prepregs is reduced to 276 seconds, such that the action of the catalyst is extended to the hot pressing process to accelerate solidification reaction and enhance the Tg to 178 degrees. With reference to Control 2, four times of oxalic acid is used to achieve a significant effect of suppressing the solidification of the prepregs, and the gel time for the manufactured prepregs is reduced to 270 seconds, such that the action of the catalyst is extended to the hot pressing process to accelerate solidification reaction and enhance the Tg to 179 degrees. With reference to Control 1, 0.55 time of oxalic acid, is used to achieve a significant effect of suppressing the solidification of the prepregs, and the gel time for the manufactured prepregs is reduced to 263 seconds, such that the action of the catalyst is extended to the hot pressing process to accelerate solidification reaction and enhance the Tg to 181. With reference to the first preferred embodiment, eight times of oxalic acid is used for optimizing the manufacturing process, and reducing the gel time to 253 seconds, and enhancing the Tg to 183 degrees.

If a large quantity of Lewis acid is used, the Tg can be improved substantially in the same manufacturing conditions. In other words, the hot pressing process can be accelerated to meet the product requirement of a specific Tg, and thus the time of the hot pressing process can be reduced. The Lewis acid such as boric acid, phosphoric acid or salicylic acid used in the present invention provides equivalent effects.

What is claimed is:

1. A thermosetting resin capable of expediting a thermosetting process, the thermosetting resin comprising:
    100 parts by weight of a primary resin, formed by mixing:
        a first brominated epoxy resin,
        an epoxy resin having four epoxy groups per molecule, and
        a second brominated epoxy resin, distinct from said first brominated epoxy resin;
    35 parts by weight of phenolic resin curing agent per 100 parts by weight of the primary resin;
    30 parts by weight of tetrabromobisphenol A curing agent per 100 parts by weight of the primary resin;
    0.1 part by weight of 2-ethyl-4-methylimidazole per 100 parts by weight of the primary resin;
    0.8 part by weight of Lewis acid per 100 parts by weight of the primary resin; and
    50-70 parts by weight of solvent per 100 parts by weight of the primary resin.

2. The thermosetting resin capable of expediting a thermosetting process as claimed in claim 1, wherein the Lewis acid is selected from oxalic acid, boric acid, phosphoric acid and salicylic acid.

3. The thermosetting resin capable of expediting a thermosetting process as claimed in claim 1, wherein the solvent is selected from propylene glycol monomethyl ether, cyclohexanone and propylene glycol monomethyl ether acetate.

* * * * *